United States Patent Office 3,378,669
Patented Apr. 16, 1968

3,378,669
METHOD OF MAKING NON-POROUS
WELD BEADS
Allan A. Dolomont, North Haven, Conn., assignor to Olin Mathieson Chemical Corporation, a corporation of Virginia
No Drawing. Continuation of application Ser. No. 339,853, Jan. 24, 1964. This application June 30, 1967, Ser. No. 650,547
6 Claims. (Cl. 219—74)

ABSTRACT OF THE DISCLOSURE

This invention relates generally to improvements in processing of aluminum welding wire, and more particularly to electrochemical treatment continuously applied to indefinite lengths of material to produce an aluminum welding wire which yields a high quality nonporous weld bead when used in welding components of aluminum articles.

---

This is a continuation of application Ser. No. 339,853, filed Jan. 24, 1964, and now abandoned.

One of the main deterrents to increased use of aluminum in highly stressed structures such as pressure vessels, missiles, etc., is the porosity found in welds made with the consumable electrode inert gas process and the non-consumable tungsten electrode inert gas process, more commonly known as the MIG and TIG processes. While the welding of aluminum under these processes has progressed steadily in recent years, its more wide spread acceptance has been retarded by the presence of porosity in the weld bead. In certain industrial applications where stresses or pressures applied to the welded parts are not great, the presence of porosity in the weld bead may not present a major problem. However, in many of the volume markets such as those indicated above, porosity in the weld bead is not permitted, and where this defect is present, the component is rejected.

Porosity in welds are generally of two types: firstly, voids resulting from entrapment of the shielding gases or atmosphere within the solidifying weld metal, and secondly voids caused by the release of hydrogen from the solidifying weld metal. The first source can be substantially reduced or completely eliminated by periodic checks on equipment and by making frequent control welds to establish that welding procedures are correct and uniform. This invention is directed toward the elimination of porosity caused by the second source, i.e., formation of hydrogen bubbles within the weld bead.

These bubbles are caused by the introduction of hydrogen containing materials into the weld bead. During the welding these materials are decomposed and the hydrogen so produced dissolves in the molten metal. Upon solidification, the lower solubility of the hydrogen in the solid metal results in the rejection of hydrogen in solution and the production of small voids in the weld.

It has been found that hydrogen containing materials may enter the weld bead from a number of sources. The inert gases used in the welding are of such high purity that they can generally be discounted as a direct source of hydrogen. However, between the gas cylinder and the welding arc, atmospheric contamination may take place or water condensation may occur on the welding equipment. Preweld inspection can usually eliminate these sources of hydrogen. A further source of hydrogen is contamination of the arc by the atmosphere mixing with the shielding gas. This can be eliminated by proper adjustment of the welding parameters. Hydrogen may also enter the weld metal from the base plate; this source is usually controlled by the metal manufacturer through proper casting fabrication techniques.

Thus, we have demonstrated that the welding wires themselves are the main uncontrollable source of hydrogen causing porosity in aluminum welds. These wires are usually smaller than 0.125" in diameter and so have a large ratio of surface area to volume. This means that the wire surface or surface oxide can contribute considerable amounts of hydrogen from adsorbed, absorbed or hydrated water in the oxide. When the high rates of wire feed (up to 500" per minute) used in welding aluminum are considered, it can be readily appreciated that contamination of the wire surface can be a major source of porosity.

It has become evident that there are two principal sources of hydrogen containing materials on the surface of the welding wire. In the production of the wire, ⅜" diameter rod is first drawn to 0.187" and subsequently passed through an annealing furnace. Lubricants of a particularly tenacious kind are used in drawing and are not usually removed before annealing. In the annealing furnace the lubricants and their products of reaction are decomposed, thus leaving small carbon particles adhering to the surface of the wire. Additional drawing to final gages causes the particles to be drawn into the surface of the welding wire. Conventionally, the wire is then degreased by known methods, packed and shipped. It has been found, however, that the conventional degreasing processes do not remove the carbon particles nor the lubricant residues from the final draw. In subsequent storage the carbon particles act as cathodic stimulators of corrosion acting as cathodes in small local galvanic cells. These allow aluminum in the presence of moisture to act as an anode and produce an aluminum hydroxide or hydrous oxide film. It is the water in this film which breaks down in subsequent welding to produce free hydrogen which produces porosity upon freezing of the molten metal in the weld bead. It has also been found that even in the absence of the cathodic stimulators of corrosion, the oxide film normally on the wires can and does take up water to produce a hydrous and hydrated oxide, particularly during long periods of storage. Again, when the wires are used in welding the water from the film is decomposed by the welding arc and forms relatively large amounts of free hydrogen which is readily taken up by the molten weld metal. The freezing of the weld metal results in the rejection from solid solution of that quantity of hydrogen which is above the solid solubility of hydrogen in the particular alloy. This rejection of hydrogen from solid solution results in weld metal porosity.

The removal of these lubricants is very difficult because, due to their complex nature, they cannot be removed by any one solvent. While chlorated hydrocarbons will generally remove petroleum type lubricants, they are not effective with the lard oil types which are used in concentrations of up to 15 percent to improve the surface appearance of drawn wire. Alcohols or other solvents are required to remove the latter. These methods, because of their complexity, are not economically feasible for mass production of welding wires. They are also ineffective in the removal of drawn-in carbon residue resulting from the decomposition or cracking of the lubricants during intermediate annealing. As indicated above, this carbon residue is harmful in that it accelerates corrosion and hydration of the wire oxide film upon exposure to humid atmospheres.

The removal of drawing lubricants and carbon residues, together with the oxide film and some base metal can be successfully accomplished by etching in solutions such as sodium hydroxide. While this method has met with some degree of commercial acceptance, it has not found wide spread favor in view of the facts that the process is difficult to control and results in an unsatisfactory surface appearance.

To obviate these and other disadvantages of prior art methods of cleaning aluminum welding wire, we have provided an improved method of high speed removal of lubricants from the surface of wires by passing the wire, as part of an electrical circuit, through an aqueous alkaline electrolyte in which the wire is caused to be anodic. This results in complete rapid and controllable degreasing of the wire so that on welding no porosity is produced, the amount of weld spatter is greatly reduced and the appearance of the surface of the weld bead is greatly improved.

Accordingly, it is a prime object of the present invention to provide a method of treating continuously moving aluminum welding wire such that welds made therefrom will be free of objectionable porosity.

It is another object of the present invention to provide a method of treating continuously moving aluminum welding wire in which the wire is rendered completely free of deleterious contaminants which produce objectionable porosity in the weld metal.

It is still another object of the present invention to provide a process for treating continuously moving aluminum welding wire which completely removes the hydrogen containing materials normally present in conventionally produced wire which materials result in hydrogen formed bubbles in the weld metal.

It is still another object of the present invention to provide a process for treating continuously moving aluminum welding wire which provides a very thin and uniform film on the wire surface to resist hydration and minimize corrosion or adsorption of water.

These and other objects of the present invention will become more apparent from a consideration of the following detailed description.

In one of its broader aspects, the objects of this invention are achieved by immersing the wire in a first aqueous alkaline solution containing an anode strip, continuously immersing the wire in a second aqueous alkaline solution containing a cathode strip, passing an electric current through the electrolytes while the wire is immersed therein, rinsing the wire in cold water, immersing the wire in a passivating and neutralizing acid bath, again rinsing the wire in cold water and finally drying and coiling the wire.

The process of this invention is directed principally toward improving the welding characteristics of several groups of aluminum alloy welding wires. One of these is the aluminum-iron-silicon group which contains aluminum ranging from 99.30% to 99.99%, balance impurities normal for this group, of which the 1000 and 1100 series of alloys are representative. Another group is the 2000 series of alloys which contains from 3% to 7% copper, 0.1% to 0.5% manganese, .05% to 0.5% titanium with balance aluminum plus impurities normal for this group. Another group to which this invention is applicable is the 4000 series containing from 3% to 14% silicon, either with or without 3% to 6% copper, with the balance aluminum plus normal impurities. Still another group is the 5000 series containing from 2% to 7% magnesium, with the balance aluminum plus normal impurities.

In accordance with the practice of this invention, a supply of welding wire suitably coiled on a spool is mounted upon suitable processing apparatus in a manner to facilitate its being unwound from the supply spool and continuously drawn through the apparatus, to be thereafter rewound on a take up spool all in a manner well known in the art. The wire is guided by any suitable means from the take off spool and into a first tank containing an aqueous alkaline solution which contains an anode strip, and is thereafter guided out of this tank, across an insulating gap, and into a second tank containing a similar solution having a cathode strip. This arrangement facilitates an electric circuit consisting of the anode strip, the first alkaline solution, the wire, the second alkaline solution and the cathode strip. By this arrangement the wire is made a part of the circuit without having to mechanically contact the wire or provide any type of rubbing contact which might tend to mar or otherwise injure the appearance of the finished wire.

It should be noted, however, that within the limitations imposed by mechanical contact of an electrode with the wire, it is possible to accomplish the objects of the invention by utilizing a single tank for anodic treatment of the wire in an aqueous alkaline solution. This method is less desirable than the double tank solution contacting method because of mechanical contact of electrode and moving wire with high current passage which usually leads to arcing and marking of the wire.

In order to achieve the desired cleaning effects on the wire surface, the alkaline baths through which the wire is passed are adjusted to have a titratable alkalinity ranging from that produced by 1% to 40% NaOH with an optimum value of approximately 10%, and a pH greater than 10. The solutions are generally prepared from any one, or a combination of several, of the compounds selected from one of two groups, either the alkali metal hydroxides and ammonium ion, or any alkali metal salt of a strong base and weak acid which hydrolyzes to an alkaline solution. Examples of the first group are hydroxides of sodium, potassium, lithium, rubidium, cesium and ammonium. Examples of the second group are sodium, potassium, lithium, rubidium and cesium salts of carbonates, phosphates and phosphites including polyphosphates and polyphosphites, and cyanides. It is, of course, possible to use mixtures of sodium hydroxide and other hydroxides as well as mixtures of hydroxides and alkali salts, in particular phosphates. A preferred alkaline electrolyte has been found to be an aqueous solution of from 3% to 15% sodium hydroxide with the balance water and preferably a solution of about 10% has been found to achieve excellent results when other variables as set forth hereinafter have been properly adjusted.

It may be desirable in some situations to include certain additives in the alkaline solutions for specific purposes. For example, wetting agents may be added which increase the rate of oil removal. Such wetting agents must, of course, be stable in the solutions used. Also, chelating agents such as EDTA (ethylenediaminetetra acetic acid) or its sodium salt, or sugar acids such as gluconic acid, may be added to prevent the formation of hard scale on tanks and heating coils.

The alkaline baths are generally maintained at a temperature ranging from room temperature to the boiling point of water, more commonly within the range of about 40 to 80° centigrade and optimally at about 65° centigrade. The temperature and concentration of the alkaline bath are generally adjusted to achieve a desired rate of metal removal in the electroetching process which takes place in the first tank. Since it is desirable to maintain metal removal as low as possible and still achieve an effective cleaning action, both alkaline concentration and temperature are adjusted to fairly low values in comparison to normal etching procedures.

While a resident immersion time ranging from 2 to 120 seconds has been found to be operable in achieving a desirable cleaning effect on the wire, an immersion time of 6 seconds with a fairly dilute solution and low operating temperature facilitates the arrangement of an efficient and high production capacity apparatus for performing the process of this invention.

With regard to current density at the anodically treated wire surface, depending upon the variables mentioned above, the current density may range 25 to 1000 amps per square foot and a voltage of between 7 to 20 depending upon the distance between the electrodes, the concentration of electrolyte, and the operating temperature.

As the wire passes through the first and second tanks, which respectively have anode and cathode strips in the electric circuit, the wire becomes cathode in the first tank and anode in the second tank. This causes, upon the application of power, a strong gas evolution at the wire in the first tank. This gas evolution has a scrubbing action on the wire which assists in the removal of the drawing lubricants and harmful residues. The gas evolution is caused by the electrolytic reduction of hydrogen to form gas bubbles which result in the scrubbing action. The electrolytic action also, to some extent, protects the aluminum against dissolution in the alkaline solution. However, some aluminum from the wire goes into solution, the amount depending on concentration, temperature and current density. Thus, a mild etching is also produced in this first tank. The extent of etching, as indicated above can be controlled by controlling the time in solution and the concentration of the alkaline solution, or the extent of current density applied to the circuit. The etching action together with the gas scrubbing completely removes the drawing lubricants, oxide film, and harmful residues.

As the now cleaned wire passes from the first tank to the second tank, its polarity is changed and the wire becomes anode in the second tank. In the second tank the wire is subjected to a mild electropolishing action which removes any hydrogen which may have entered the metal from the cathodic treatment in the first tank. Also, the positive charge in the wire repels any positively charged particles of dirt which may still adhere to the wire surface, together with any oxidizable impurities such as metal deposits. In the second tank the current density must be sufficiently high to effect an electropolishing action which deposits a thin oxide film on the surface of the wire to protect the wire against any subsequent hydration during periods of extensive storage prior to use. If the current density is not sufficiently high, the wire will be subjected to an electroetching effect which results in uneven metal removal with a consequent undesirable appearance. After emerging from the second tank, the resultant wire surface is very smooth and shiny in appearance and is exceptionally clean and free of contaminants which would otherwise have a deleterious effect upon the weld bead.

With regard to the passivating and neutralizing acid bath through which the wire passes after emerging from a cold water rinse following the anodic electrolytic bath, it has been found that a nitric, hydrofluoric or chromic acid solution having concentrations of these acids in the range of 2 to 70 percent, are suitable for removing smut, and to neutralize any residue or hydroxide solution or other residue which may still be adhering to the wire surface. The acid bath may be limited to as short a time as necessary, usually a few seconds, to remove the aforementioned metal or hydroxide residue.

Subsequent to the acid bath, the wire is passed through a second cold water rinse, after which it is dried by a conventional hot air blowing apparatus and recoiled on a suitable spool.

Aluminum welding wire treated by the above described electrocleaning method results in welds that are found to be completely free of porosity. The uniformity of the surface of the wire extends welding contact tube life and results in a welded arc that is very stable. The weld bead is very smooth and free of the dark smut that is present when conventionally cleaned wires are used. It has been found that spatter that is generally disposed along the weld bead is also reduced. Of major importance to the achievement of a porosity free weld is the fact that inert gas welding wire cleaned by the process discussed here is far less susceptible to hydration and/or corrosion in humid atmospheres than uncleaned or conventionally cleaned wire. Thus, it has been found that after exposure to high humidity atmospheres in the order of 98 percent relative humidity at a 100° F. for 60 days, electrocleaned wire still produces acceptable welds whereas uncleaned or conventionally cleaned wire presents porous welds after even shorter exposures.

The following are specific examples of the practice of this invention and are to be deemed purely illustrative and not all inclusive.

Example I

A sample of aluminum welding wire fabricated from alloy 5356 was continuously immersed in an aqueous solution of 10 percent sodium hydroxide at 65° centigrade in a first tank containing an anode strip, was withdrawn from this tank and immersed in a second aqueous solution of 5 percent sodium hydroxide maintained at 65° centigrade in a second tank containing a cathodic strip. A current density of 950 amps per square foot at 11 volts was applied to the anode. The wire passed through the alkaline solutions, then through a water rinse, a nitric acid rinse, a second water rinse, and a drying and coiling operation at a rate of 40 feet per minute with a resident time of 7 seconds in each of the alkaline baths. The dried and coiled wire was then stored for 30 days in an atmosphere of 95 percent relative humidity at 100° F. After welding with this wire careful X-ray inspection of the weld bead showed no detectable porosity.

Example II

A sample of aluminum welding wire fabricated from alloy 4043 was continuously immersed in an aqueous solution of 10 percent sodium hydroxide at 65° centigrade in a first tank containing an anode strip, was withdrawn from this tank and immersed in a second aqueous solution of 5 percent sodium hydroxide maintained at 65° centigrade in a second tank containing a cathodic strip. A current density of 950 amps per square foot at 11 volts was applied to the anode. The wire was passed through the alkaline solutions, then through a water rinse, a nitric and hydrofluoric acid rinse, a second water rinse, and a drying and coiling operation at a rate of 40 feet per minute with a resident time of 7 seconds in each of the alkaline baths. The dried and coiled wire was then stored for 30 days in an atmosphere of 95 percent relative humidity at 100° F. After welding with this wire careful X-ray inspection of the weld bead showed no detectable porosity.

Example III

A sample of aluminum welding wire fabricated alloy 2319 was continuously immersed in an aqueous solution of 10 percent sodium hydroxide at 65° centigrade in a first tank containing an anode strip, was withdrawn from this tank and immersed in a second aqueous solution of 5 percent sodium hydroxide maintained at 65° centigrade in a second tank containing a cathodic strip. A current density of 950 amps per square foot at 11 volts was applied to the anode. The wire was drawn through the alkaline solutions, then through a water rinse, a nitric acid rinse, a second water rinse, and a drying and coiling operation at a rate of 50 feet per minute with a resident time of 5 seconds in each of the alkaline baths. The dried and coiled wire was then stored for 30 days in an atmosphere of 95 percent relative humidity at 100° F. After welding with this wire careful X-ray inspection of the weld bead showed no detectable porosity.

Example IV

A sample of aluminum welding wire fabricated from alloy 1100 was continuously immersed in an aqueous solution of 10 percent sodium hydroxide at 65° centigrade in a first tank containing an anode strip, was withdrawn from this tank and immersed in a second aqueous solution of 5 percent sodium hydroxide maintained at 65° centigrade in a second tank containing a cathodic strip. A current density of 950 amps per square foot at 11 volts was applied to the anode. The wire was passed through the alkaline solutions, then through a water rinse, a nitric acid rinse, a second water rinse, and a drying and coiling operation at a rate of 30 feet per minute with a resident time of 7 seconds in each of the alkaline baths. The dried and coiled wire was then stored for 30 days in an atmosphere of 95 percent relative humidity at 100° F. After welding with this wire careful X-ray inspection of the weld bead showed no detectable porosity.

It will be apparent from the foregoing description that there has been provided a method of treating aluminum welding wire which provides a solution to the foregoing problems and achieves the aforementioned objects. It is to be understood that the invention is not limited to the examples described herein which are deemed to be merely illustrative of the best modes of carrying out the invention, but rather is intended to encompass all such modifications as are within the spirit and scope of the invention as set forth in the appended claims.

What I claim and desire to secure by Letters Patent is:

1. A method of making a high quality non-porous weld bead comprising the steps of
   (A) providing an indefinite length of continuously moving aluminum welding wire,
   (B) continuously passing said wire through a first aqueous alkaline solution containing an anode electrode, said anode being spaced from said wire by said first solution,
   (C) continuously passing said wire through a second aqueous alkaline solution containing a cathode electrode, said cathode being spaced from said wire by said second solution, said first and second solutions having a titratable alkalinity equivalent to sodium hydroxide solutions ranging from 1 to 40%,
   (D) applying an electric current to said electrodes as said wire passes through said solutions whereby said wire is cathodic in said first solution and anodic in said second solution,
   (E) rinsing said wire,
   (F) passing said wire through a passivating and neutralizing acid bath,
   (G) rinsing said wire,
   (H) drying said wire, and
   (I) welding with said wire to provide a high quality, non-porous weld bead.

2. The method of claim 1 wherein said first and second solutions are aqueous alkaline solutions of a compound selected from the group consisting of alkali metal hydroxides, ammonium hydroxide, alkali metal salts of a strong base and weak acid which hydrolyze to an alkaline solution, and mixtures thereof, said solutions having a pH of over 10.

3. The method of claim 1 wherein said alkaline solutions are maintained at a temperature within the range of 40° to 80° C.

4. The method of claim 1 wherein said current density is within the range of 25 to 1000 amps/sq. ft.

5. A method of making a high quality non-porous weld bead comprising the steps of
   (A) providing an indefinite length of continuously moving aluminum welding wire,
   (B) continuously passing said wire through a first aqueous alkaline solution containing an anode electrode, said anode being spaced from said wire by said first solution,
   (C) continuously passing said wire through a second aqueous alkaline solution containing a cathode electrode, said cathode being spaced from said wire by said second solution, said first and second solutions having a titratable alkalinity equivalent to sodium hydroxide solutions ranging from 1 to 40%,
   (D) applying an electric current to said electrode as said wire passes through said solutions whereby said wire is cathodic in said first solution and anodic in said second solution, wherein the total residence time in said first and second solutions is from 2 seconds to 120 seconds,
   (E) rinsing said wire,
   (F) passing said wire through a passivating and neutralizing acid bath,
   (G) rinsing said wire, and
   (H) welding with said wire to provide a high quality, non-porous weld bead.

6. A method of making a high quality non-porous weld bead comprising the steps of
   (A) providing an indefinite length of continuously moving aluminum welding wire,
   (B) continuously passing said wire through a first aqueous alkaline solution containing an anode electrode, said anode being spaced from said wire by said first solution,
   (C) continuously passing said wire through a second aqueous alkaline solution containing a cathode electrode, said cathode being spaced from said wire by said second solution, said first and second solutions having a titratable alkalinity equivalent to sodium hydroxide solutions ranging from 1 to 40%,
   (D) applying an electric current to said electrodes as said wire passes through said solutions whereby said wire is cathodic in said first solution and anodic in said second solution, wherein the total residence time in said first and second solutions is from 2 seconds to 120 seconds,
   (E) rinsing said wire, and
   (F) welding with said wire to provide a high quality, non-porous weld bead.

References Cited

UNITED STATES PATENTS

| | | | |
|---|---|---|---|
| 1,068,411 | 7/1913 | Chubb | 204—28 |
| 1,946,150 | 2/1934 | Tosterud | 204—58 |
| 2,096,309 | 10/1937 | Pullen | 204—58 |
| 2,376,082 | 5/1945 | Pullen | 204—29 |
| 2,671,717 | 3/1954 | Furguson | 204—33 |
| 2,681,402 | 6/1954 | Muller | 117—202 |

HOWARD S. WILLIAMS, *Primary Examiner.*

T. TUFARIELLO, *Assistant Examiner.*